United States Patent

[11] 3,575,656

| [72] | Inventor | Ward W. Watrous, Jr. |
| --- | --- | --- |
| | | Geneva, Ill. |
| [21] | Appl. No. | 756,603 |
| [22] | Filed | Aug. 30, 1968 |
| [45] | Patented | Apr. 20, 1971 |
| [73] | Assignee | I-T-E Imperial Corporation |
| | | Philadelphia, Pa. |

[54] METHOD AND APPARATUS FOR MEASURING PRESSURE IN VACUUM INTERRUPTERS
9 Claims, 7 Drawing Figs.

| [52] | U.S. Cl. | 324/33 |
| --- | --- | --- |
| [51] | Int. Cl. | G01n 27/62 |
| [50] | Field of Search | 324/33, 28 (RS), 54 |

[56] References Cited
UNITED STATES PATENTS

| 3,495,165 | 2/1970 | Cobine et al. | 324/33 |
| --- | --- | --- | --- |
| 2,812,491 | 11/1957 | Figlio et al. | 324/54 |
| 2,864,998 | 12/1958 | Lee | 324/33 |
| 3,051,868 | 8/1962 | Redhead | 324/33X |
| 3,263,162 | 7/1966 | Lucek et al. | 324/33 |

OTHER REFERENCES
Fennell; T.R. VOLTAGE BREAKDOWN TESTING TECHNIQUES, IBM Technical Disclosure Bulletin Vol. 8 No. 10 March, 1966.

*Primary Examiner*—Gerard R. Strecker
*Attorney*—Ostrolenk, Faber, Gerb and Soffen ABSTRACT: Method and apparatus for measuring pressure in vacuum interrupters in which electrical connection to the metallic shield provided within the interrupter is not available.

Transverse electrostatic and electromagnetic fields are generated within the interior of the vacuum interrupter so as to cause stray electrons within the interior space of the vacuum interrupter to travel in cycloidal or elliptical paths. The tortuous route assumed by the electrons greatly enhances the propability of an ionizing collision The pressure measurements are taken by measuring the number of positive ions collected at the negative electrode and comparing the measurement to a calibration chart on which pressure versus current has been plotted. The measurements may be taken by measuring the time required to charge a capacitor whose charging rate is determined by the vacuum interrupter resistance which is the unknown quantity being measured.

METHOD AND APPARATUS FOR MEASURING PRESSURE IN VACUUM INTERRUPTERS

The present invention relates to vacuum interrupters and more particularly to a novel method and apparatus for measuring the pressure within a vacuum interrupter in which electrical connection to the shield provided within the interrupter is not available.

Vacuum interrupters are being employed in increasing amounts as integral elements of circuit protective devices in low or high voltage power distribution networks due to the high speed current interruption characteristic of such vacuum interrupters as well as the extremely short distance required to separate the contacts for current interruption as compared with other prior art current interrupters.

In such vacuum interrupters it is well known that interior pressures of higher than approximately $10^{14}$ Torr result in a failure of the interrupter. It is therefore extremely important to provide means for quickly and accurately measuring the pressure within the interior of a vacuum interrupter in order to be assured of safe, reliable operation thereof.

One conventional method of measuring pressure within a vacuum interrupter is that in which the elements of the vacuum device are employed to form its own ionization gauge. This principle is well known in the art, one of the earliest devices being the Penning gauge. More recently, the type of gauge commonly referred to as a cold cathode magnetron ionization gauge has been developed to a high state of perfection by P. A. Redhead as described in papers covering the subject appearing as early as 1958.

The principles of the cold cathode magnetron ionization gauge have been well covered in present day literature and therefore a detailed description thereof will be omitted for purposes of simplicity. For purposes of the present invention it is sufficient to understand that such a gauge consists of a pair of plates mounted within the vacuum envelope between which a static electric field is generated. The electric plates are immersed in a magnetic field aligned substantially at right angles to the static field. Through the application of the static and magnetic fields of the proper field strength, any stray electrons within the confined space will not travel directly to the positively biased plate, but will travel in cycloidal, or elliptical paths within the confined space. At low pressures, for example at pressures of the order of $10^{14}$ Torr, and below, relatively few gas molecules are present in the vacuum space, therefore the tortuous route taken by the electrons greatly enhances the number of collisions with the remaining molecules, so as to enhance the probability of an ionizing collision. Since the pressure of the confined space is determined by measuring the number of positive ions within the vacuum envelope, it is obvious that any method which increases the ration of ions/molecules (or ions/atoms) will also magnify the sensitivity of the measuring device.

The current produced in a magnetron type gauge is proportional to an exponential of pressure. Thus, by measuring current the pressure of the vacuum structure can be directly obtained.

One method of determining pressure within a vacuum structure is described in issued U.S. Pat. No. 3,263,162 in which a cold cathode magnetron ionization principle is employed to measure pressure within the vacuum circuit interrupter through the use of existing interrupter elements as the gauge elements and by immersing the vacuum apparatus in a magnetic field.

A primary concept of the above-mentioned patent necessitates the use of the vapor condensing shield as one element of the gauge. Either one, or both, of the remaining contact electrodes in the vacuum apparatus is employed as the other electrical element of the gauge. A static field is generated between these elements by connection to a suitable voltage source. When an axial magnetic field is applied to the device, a crude cold cathode magnetron gauge is created. Through measurement of the current flow between the vapor condensing shield and the above-mentioned selected electrode, the pressure of the interrupter may be determined.

While application of the magnetron gauge principle becomes practical for a vacuum apparatus of the type described in the above-mentioned patent, the system described therein is impractical and is useless for other forms of vacuum interrupters in which the vapor condensing shield is not provided with an available electrical terminal or other connection provided with an available electrical terminal or other connection provided at the exterior of the vacuum interrupter structure thereby eliminating the possibility of use of the shield as one of the active electrodes in the formation of the magnetron gauge. Thus, pressure measurement by the method described in the above-mentioned patent is limited to vacuum interrupters in which an electric connection is available to the vapor shield from the exterior of the circuit whereas in other structures in which such an electrical connection is unavailable the arrangement is impractical and useless.

The present invention described herein eliminates the necessity of providing an electrical connection for the vapor condensing shield in the pressure measurement operation and thereby has universal application.

The method and apparatus of the present invention is comprised of providing a voltage source of suitable magnitude which is coupled across the electrical contacts of the vacuum interrupter, which contacts are maintained in the fully opened position.

A voltage source of suitable magnitude generates a radially aligned electrostatic field. Suitable magnetic means is positioned to surround the envelope of the vacuum apparatus in order to generate a magnetic field whose flux lines are transverse and preferably perpendicular to the field lines of the electrostatic field. The transversely aligned electrostatic and magnetic fields cause stray electrons within the confined space of the vacuum envelope to travel in a tortuous path through the confined space to greatly enhance the probability of ionizing collisions. Ions collected at the negatively biased electrode of the interrupter apparatus are measured by suitable current measurement means. The current measurement is then converted into a pressure valve by reference to a calibration chart relating pressure to current. Obviously, if desired, the current measuring means may be provided with suitable circuit means for directly converting the current reading into a pressure reading.

If desired, the magnetic field generated may be radially rather than axially aligned in order to obtain the desired current or pressure measurement reading, however, this alternative approach results in a notable loss of sensitivity.

The pressure measurement may be obtained through the use of a novel measurement circuit capable of measuring very high electric resistance in the order of $10^7$-$10^{16}$ Ohms. As the equivalent resistance of the space within the vacuum interrupter subjected to cross electric and magnetic fields is proportional to the ion population within the space, the measurement of equivalent resistance becomes a simple method of determining the gas pressure within a vacuum interrupter.

Although a number of methods are presently available for measuring very high resistance, many of these methods require special high gain amplifiers or other complicated and expensive circuitry yielding inherent disadvantages in their use. The measurement circuit of the present application eliminates all of the disadvantages and expense of conventional measurement circuits by providing means for counting the number of times within a given space interval a capacitor is caused to charge and discharge. The charging rate of the capacitor is established by the unknown quantity, namely the equivalent resistor of the vacuum interrupter subjected to the cross electric and magnetic fields. By counting the number of times in which the capacitor is charged within a given time interval, the resistance of the vacuum interrupter under measurement can be easily obtained. The pressure within the vacuum interrupter may then be determined by resorting to a chart equating resistance and pressure or suitable means may be provided for directly converting the time reading into a pressure measurement if desired.

It is therefore one object of the present invention to provide a novel method and apparatus for measuring pressure within a sealed vacuum apparatus.

Another object of the present invention is to provide a novel method and apparatus for measuring pressure within a sealed vacuum apparatus in which the vapor shield provided therein does not include means available external to the vacuum interrupter envelope for connection into an electric circuit so as to preclude its use as one element of the ionization gauge.

Still another object of the present invention is to provide a novel method and apparatus for measuring pressure within the confined space of vacuum apparatus comprising the steps of applying transversely aligned electrostatic and magnetic fields within the confined space of the vacuum envelope and measuring the ionization current generated therein as a result of ionizing collisions caused by the stray electrons within the vacuum envelope.

Still another object of the present invention is to provide a novel method and apparatus for measuring pressure within vacuum structures comprising the steps of generating transversely aligned electrostatic and magnetic field patterns within the confined space of the vacuum envelope wherein one of said fields is radially aligned while the other of said fields is axially aligned; and measuring the resulting ionization current to determine the pressure within the confined space of the vacuum envelope.

Yet another object of the present invention is to provide a novel method and apparatus for measuring pressure within vacuum structures or other devices wherein high resistance measurements are to be made, comprised of counting the number of times in which a capacitor is charged within a predetermined time interval wherein the charging rate is established by the resistance value of the component whose resistance is being measured.

These as well as other objects of the present invention will become apparent when reading the accompanying descriptions and drawings in which:

FIG. 1A is an elevational view showing an alternative apparatus for obtaining the desired measurement.

As was previously described the current produced in a magnetron type gauge may be determined from the following relationship:

$I = bp^n$; Where $b = A$ constant depending on the gauge construction; $n = A$ constant (usually of the order of 1·1); $p =$ pressure; and $I =$ current.

Figure 1:
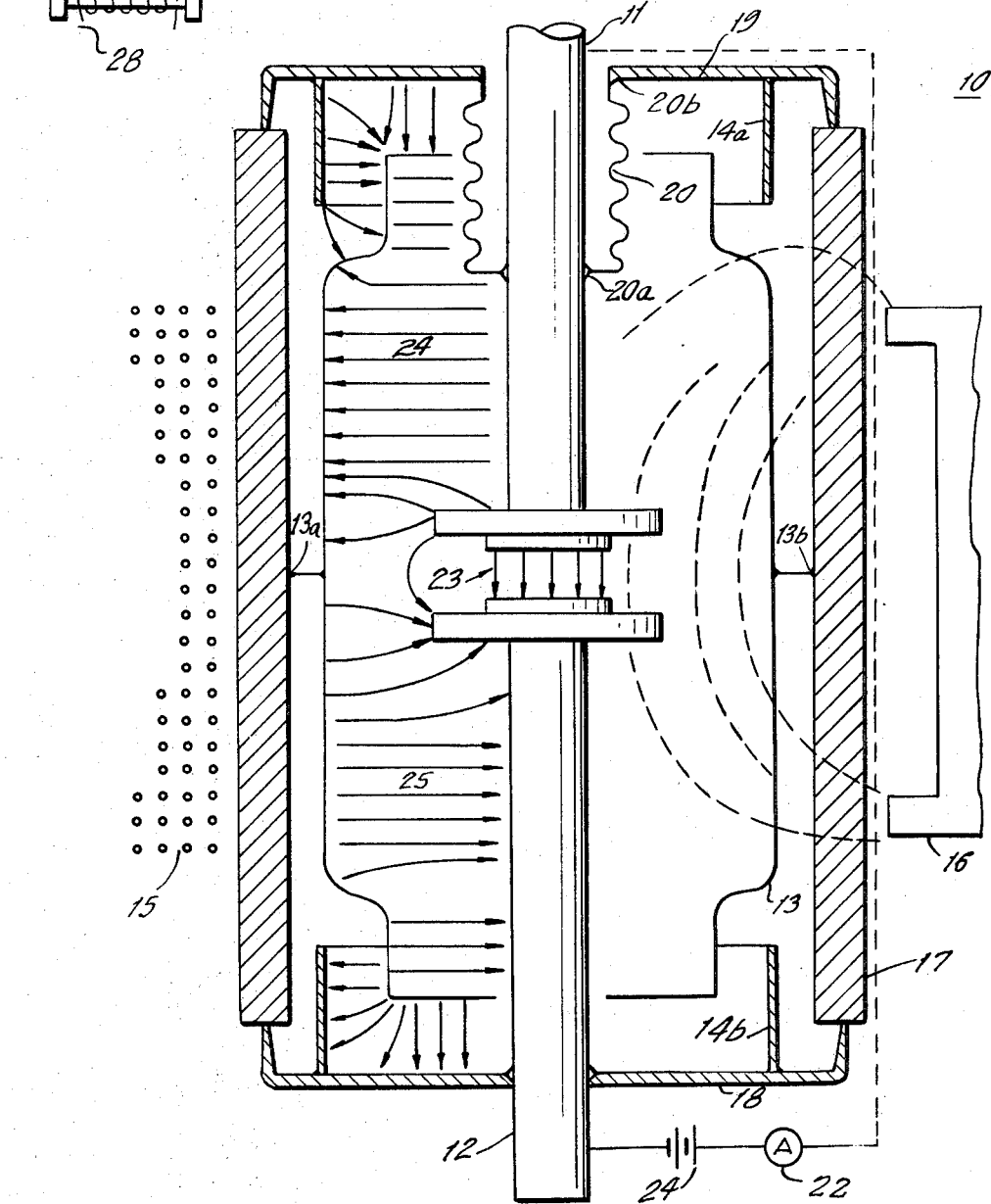
FIG. 1 is a sectional view showing the apparatus employed in the novel method of the present invention.

The pressure may be determined from the above expression after having obtained a current reading which may be taken through the use of the apparatus shown in FIG. 1. The apparatus of the FIG. may be employed to obtain pressure measurements for a variety of different vacuum structures, however, the arrangement of FIG. 1 depicts one preferred embodiment of obtaining pressure measurements for a typical vacuum interrupter 10 which is comprised of movable and fixed electrical contacts 11 and 12, respectively. The stationary electrical contact 12 is rigidly secured to one end surface 18 while the movable electrical contact 11 is movably mounted relative to another end surface 19. The vacuum seal is maintained by a bellows structure 20 which is secured at its opposite ends to movable electrical contact 11 at 20a and to the fixed end wall 19 at 20b. The end walls 18 and 19, together with a substantially cylindrical-shaped envelope 17, form the envelope of the vacuum interrupter, hermetically sealing the confined interior space. A cup-shaped cylindrical shield 13 surrounds the electrical contacts 11 and 12 and is continuously secured to the cylindrical envelope 17 at 13a and 13b, for example. Any other suitable mounting structure may be employed. Additional shielding may optionally be employed in the form of upper and lower cylindrical rings 14a and 14b, respectively, to form a shield for preventing vapor deposits from forming upon the interior surface of cylindrical-shaped member 17.

In order to provide an axial magnetic field an annular-shaped magnet which may either be comprised of electrical windings 15 or alternatively may be an annular-shaped permanent magnet 16, is positioned to substantially surround the cylindrical housing member 17.

In the vacuum interrupter design 10 shown in the FIG., it is not possible to connect the vapor condensing shield 13 into an electrical circuit. The method described herein accomplishes the requirement of obtaining crossed magnetic and electrostatic fields with an electrically inaccessible vapor condensing shield, while at the same time providing an axially aligned magnetic field pattern.

The movable electrical contact 11 which operates as one electrode for the measurement circuit, is opened as widely as is practical. A high voltage source 24 in series circuit with a current measuring device such as, for example, an ammeter 22 is coupled across the electrical contacts 11 and 12. The voltage source generates an electric field which exists not only between the electrodes (shown at 23) but extends radially between all points at electrode potential and the vapor condensing shield and between the vapor condensing shield and the remaining electrode and other parts at its potential. In effect, the top-half of the vacuum interrupter has a static field in one direction (shown at 24) while the lower-half of the interrupter provides a field in the opposing direction (shown at 25). The vacuum interrupter is thus converted into two magnetron diodes in electrical series, one-half being a conventional magnetron diode and the other half being an inverted magnetron diode, i.e. one in which the conventional polarity is reversed. The vapor shield serves as a common electrode, operating at a "floating potential" which is approximately half way between applied potential and ground. Interaction with the magnetic field developed by either the electrical winding 15 or the annular-shaped permanent magnet 16 produces electron motion in opposite directions in the top and bottom portions. Although electron motion is in opposing directions in the upper and lower portions of the vacuum interrupter, this is of no practical significance since the primary objective is that of generating ions which are collected by the negative electrode (12) and the resulting current is measured by current measurement means 22. The voltage necessary to produce the optimum static field is typically higher than that required if the field was produced between two opposing surfaces. Experimentation has proved that an electrical potential potential of the order of 10 kilovolts provides satisfactory results. However, any potential within the range from 1–½ to 18 kilovolts, depending on the interior pressure, will provide satisfactory results.

As indicated in the FIG., the radial field paths vary in strength, depending upon their axial location. As a result of this, the equipotential lines form a rather complex pattern. As a result, it is not possible to state with certainty exactly which region within the confined space of the vacuum interrupter produces maximum ionization. In practice, this knowledge is not important since each interrupter geometry must be individually calibrated and, as long as this is done, the actual location of the discharge path becomes mainly a question of academic interest.

Once the current measurement is obtained, the pressure measurement may be directly obtained from the equation relating current to pressure, set forth hereinabove or conversely, may be obtained by referring to a calibration chart (not shown) upon which pressure versus current has been plotted.

Another method of producing a cross-magnetic field in an interrupter wherein the vapor condensing shield is unavailable for electrical connection exterior to the vacuum structure, is that of applying voltage between the electrodes 11 and 12 and generating a radial magnetic field rather than an axial magnetic field. This may be carried out by providing a magnet 29 having a coil 28 and being arranged on opposite sides of the vacuum interrupter, as shown sectionally in FIG. 1A. Investigation of this technique indicates a noticeable loss of sensitivity which appears to be due to the magnetic shielding effect of the vapor condensing shield 13 (which shield is commonly constructed from nickel, which is a magnetic material) and further due to the fact that the volume within the vacuum interrupter in the region where the magnetic and static fields intersect is small compared to that obtained through the use of a magnetic field having an axially aligned field pattern.

In addition, the physical construction of a high field radial-type magnet becomes somewhat complicated compared to either a concentric coil or a ring-type permanent magnet. It was further found that placement of the magnet with respect to the interrupter is critical and greatly affects the accuracy of the measurement. For example, it is preferable to align the magnet producing an axially aligned field such that the radial center line of the magnetic field is roughly in the same plane as the radial center line of the vacuum interrupter. Large changes in the axial direction greatly reduce the magnitude of ion current and in some instances prevent any measurable ion production. It has also been found that reversal of the static field polarity also affects the value of ion current, as well as the voltage at which ionization occurs. (This latter effect has been observed only in devices which were not axially symmetrical and conceivably would not be present in a completely symmetrical structure). With regard to the magnetic means for developing a radially aligned field, it is preferable to position the magnetic field generating means such that the mid point of the magnetic axis crosses the approximate mid point of the space between the open electrodes.

Figure 2:
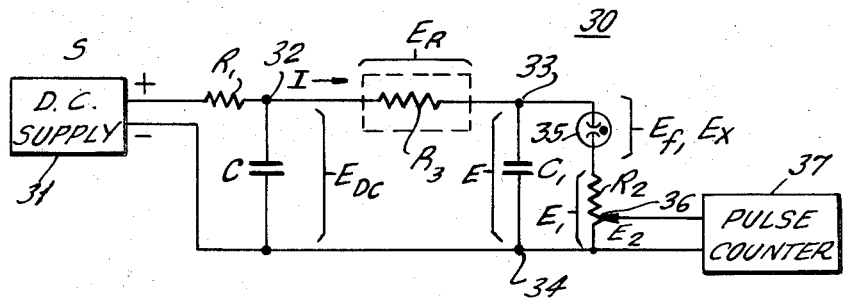
FIG. 2 is a schematic diagram showing a measurement device which may be employed in the apparatus of FIG. 1 as an alternative to the meter shown therein.

As an alternative to the current measurement means 22 of FIG. 1, it is possible to employ the high resistance measurement circuit shown in FIG. 2. This device has been successfully applied to measuring the effective resistance of the space between two electrodes of a "pinched off" vacuum interrupter when the space between the electrodes has been subjected to cross electric and magnetic fields in order to form a cold cathode magnetron pressure gauge. The circuitry to be described has been found to be quite capable of measuring very high resistance of the order of $10^7$–$10^{15}$ Ohms. As the equivalent resistance of the interior space within the vacuum interrupter is proportional to the ion population within the space, its measurement is a simple method of determining the gas pressure within a vacuum chamber.

Although the method of resistance measurement to be described herein has been successfully employed in a pressure measuring system, it should be obvious to those skilled in the art that the method and apparatus may be employed wherever the measurement of high resistance is required.

Before considering the method and apparatus of FIG. 2, its distinct advantages will become obvious after a consideration of those conventional devices presently available for taking such measurements. There are several existing methods of measuring high resistance, the cathode ray oscilloscope and the picoammeter being two particularly advantageous instruments. For laboratory use, wherever exact measurements must be made either of these instruments are satisfactory. However, both of these instruments employ special high gain amplifiers which have several inherent disadvantages. These include:

1. Errors due to zero drift when used to measure direct current.
2. Errors occurring when in the presence of strong fields—either electric or magnetic.
3. The above instruments are overly responsive to transient voltages.
4. Both of the above instruments may be easily damaged and are difficult and expensive to repair.
5. Both of the above instruments normally require skilled personnel for their operation.
6. Both of the above instruments are relatively expensive.
7. When used to measure ion current in a magnetron type cold cathode gauge, dangerously high voltages appear at the terminals of the instrument.

The circuitry described hereinbelow eliminates the above disadvantages and offers a simple, general method of measuring high resistance through the use of low cost circuitry.

FIG. 2 shows one preferred embodiment 30 for taking the high resistance measurements and is comprised of a DC power supply 31 having a resistor $R_1$ and a capacitor C connected across its output terminals. An unknown resistance to be measured is coupled between terminals 32 and 33 and in the present instance, may be the terminals of the vacuum interrupters 11 and 12 as shown in FIG. 1. A second capacitor $C_1$ is coupled between terminals 33 and 34 and has coupled in parallel therewith a series circuit comprised of a neon glow tube 35 and an adjustable resistor $R_2$ having an adjustable arm 36 enabling the resistor to operate as a voltage divider. A pulse counter 37 is coupled across adjustable arm 36 and terminal 34 for counting the current pulses developed within the series circuit branch comprised of the elements 35 and $R_2$.

The operation of the circuitry of FIG. 2 is as follows:

The DC supply 31 supplies the voltage to capacitor C, which voltage has the value $E_{DC}$ which is held constant. Capacitor $C_1$ charges at a rate determined by the unknown value of the component being measured which is indicated as a resistance $R_3$. When the voltage being developed across capacitance $C_1$ reaches a value $E_f$, which is the "breakdown voltage" of the gas discharge device 35 (which is usually a neon glow lamp), the energy being stored by capacitor $C_1$ is permitted to discharge through the glow lamp 35 and voltage divider $R_2$ producing a voltage pulse $E_1$ across resistor $R_2$, which voltage pulse is depicted in FIG. 3D. The discharge of the energy and capacitor $C_1$ continues until the cutoff voltage of the gas discharge device 35 is reached (the value $E_x$) at which time capacitor $C_1$ through resistor $R_2$ will again occur as soon as the breakdown voltage of the device 35 is reached. This operation continues in this manner.

Figure 3A:
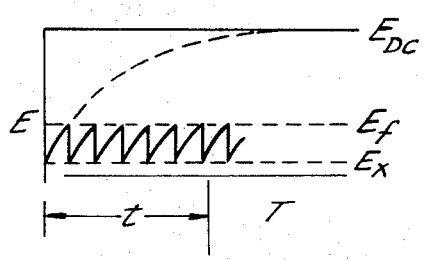
FIGS. 3A, 3B, 3C and 3D show curves useful in describing the operation of the measurement device of FIG. 2.

FIG. 3A shows a typical operation cycle. Capacitor $C_1$ starts to charge at a rate determined by the quantity $R_3 C_1$. However, long before the voltage on capacitor $C_1$ reaches the steady state value which is $E_{dc}$, the gas discharge device 35 "fires" at a voltage level $E_f$. The voltage across $C_1$ then falls to a value $E_x$ which is the extinction voltage of gas discharge device 35. This cycle can be seen to be continuously repeated, as shown by FIG. 3A, at a rate which is determined solely by the value of the resistance of device $R_3$ as all other parameters of the circuit are maintained constant. It can be seen that if the number of pulses occurring within a given time period $t$ are counted then the "count" obtained will be proportional to the value of $R_3$.

Figure 3C:
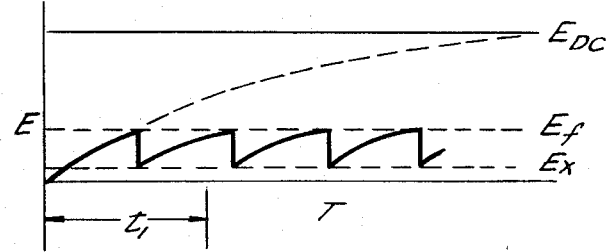
Figure 3B:
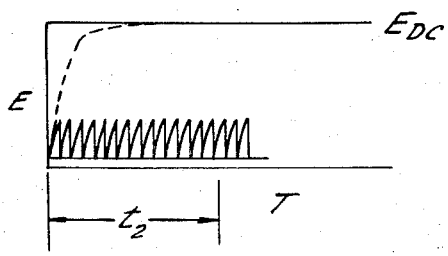
Figure 3D:
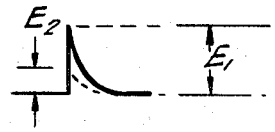

FIG. 2B shows an example wherein the resistance of device $R_3$ is of a lower value than FIG. 2A. Thus, a great number of discharges of capacitor $C_1$ occur due to the reduced resistance in the circuit causing a greater number of pulses per given time interval $t_2$. FIG. 3C illustrates the response when the resistance of device $R_3$ is higher than the device represented by the waveform of FIG. 2A. As is obvious, the increased resistance of device $R_3$ limits the current flowing to capacitor $C_1$ resulting in fewer discharges per unit time interval $t_1$. For use in the pressure gauge application, the latter case would represent the lowest pressure.

In a pressure determining application, wherein the internal pressure of a "sealed off" tube is to be measured, the time $t$ is preferably made short to minimize "voltage pumping" within the tube under test.

The actual count of capacitor discharges can be measured in a number of ways. As one example, an oscilloscope or a high-speed recorder may be coupled across elements 36 and 34. Preferably, a simple electronic counter which will directly display the "count" (i.e., the number of pulses) obtained for each selected time interval may be employed. This pulse counter 37, shown in FIG. 2, may then be employed to convert the number of pulses or "count" obtained from the unknown resistance or pressure to a value which can be read off directly, by suitable circuitry, or from a properly calibrated graph or table. Counter 37 is driven by a reduced voltage $E_2$ taken across a portion of resistor $R_2$ due to the voltage dividing function performed by the adjustable arm 36. Employing the voltage divider makes the circuitry compatible with the input voltages necessary for operating pulse counter 37.

It should be obvious that many modifications of the circuit of FIG. 2 are possible. However modified, the basic principle of the invention is the measurement of the time required to place a specific charge on capacitor $C_1$. When the resistance of device $R_3$ is very high, the charge rate is very long, but eventually the same charge quantity is reached as determined by the "breakdown voltage" of the gas discharge device. The effect of the resistance measurement system described herein provides the benefit of amplification without the need for any amplifiers. It is preferable that the time interval $t$ being measured be of sufficient length to allow for the measurement of several charge cycles so as to improve the accuracy of the measurement.

It can be seen from the foregoing that the present invention provides a novel method and apparatus for easily and accurately obtaining a pressure measurement for vacuum interrupters. Whereas the preferred embodiment described herein relates to vacuum interrupters, it should be understood that the present invention may be employed to other similar vacuum apparatus with equal success.

As an alternative to the arrangement shown in FIGS. 1 or 2 the current measuring device 22 (or 30) may be substituted by an electrical circuit which directly provides a pressure reading. For example, the current measured may be applied to an analog circuit which directly divides the current reading by the constant $b$ and raises the resulting quantity $(I/b)$ to the $n$ power. Such an arrangement avoids the necessity of referring to a calibration chart.

Although there has been described a preferred embodiment of this novel invention, many variations and modifications will now be apparent to those skilled in the art. Therefore, this invention is to be limited, not by the specific disclosure herein, but only by the appending claims.

I claim:

1. A method for obtaining pressure measurements of the confined space within vacuum interrupters and the like having an evacuated envelope, a metallic vapor-condensing shield wholly contained within said evacuated envelope, and first and second electrical contacts positioned within the confined space of said envelope and said shield and surrounded by said shield comprising the steps of:

developing an electrostatic field between said shield and said first and second contacts and between said first and second contacts by externally applying a unidirectional voltage across said electrical contacts while maintaining said shield electrically insulated from said contacts so that said shield is maintained at a potential substantially intermediate the potentials at each of said contacts whereby the electrostatic field lines between said first and second contacts are in the axial direction, the electrostatic field between said shield and said first contact are in a direction transverse to the axial direction and the electrostatic field lines between said shield and said second contact are in a direction transverse to the axial direction and opposite in direction to the field lines between said first contact and said shield;

generating a magnetic field within the region of said shield and said first and second contacts by magnet means positioned external to said envelope so that said electrostatic and magnetic fields are simultaneously present and are aligned with their field patterns being substantially transverse to one another;

measuring the ion current flowing between the two electrical contacts by externally coupling measuring means between said contacts so that said current flow can be determined as a result of ionizing collisions caused by stray electrons acted upon by the transversely aligned electrostatic and magnetic fields;

determining the pressure within the confined space of said vacuum envelope from said current reading.

2. The method of claim 1 wherein the step of providing an electrostatic field is further comprised of applying a high voltage unidirectional source between the electrical contacts of the vacuum interrupter.

3. The method of claim 2 wherein the step of applying a high voltage unidirectional source between the electrical contacts of the vacuum interrupter is further comprised of the step maintaining the electrical contacts to substantially the fully opened position throughout the measurement operation.

4. The method of claim 1, wherein the step of generating a magnetic field is further comprised of aligning the magnetic field so that its magnetic field pattern is substantially in the axial direction within the confined space of said evacuated envelope.

5. The method of claim 1 wherein the step of determining the pressure measurement is further comprised of determining the pressure measurement from the current reading obtained by means of the relationship between current and pressure given by $I=bp^n$ Where $b=A$ constant depending on the gauge construction $n=A$ constant (usually of the order of 1.1)

$p=$ pressure $I=$ current.

6. Apparatus for determining the pressure within vacuum apparatus wherein the vacuum apparatus is comprised of a pair of electrical contacts movable between an engaged and a disengaged position, said contacts being disposed within the confined space of a vacuum envelope and surrounded by a metallic vapor-condensing shield wholly contained within said envelope and electrically insulated from said contacts, said apparatus being comprised of:

a high voltage source being externally and electrically coupled between said electrical contacts which are maintained in substantially the fully opened position so that said vapor-condensing shield operates at a floating potential level which is substantially intermediate the potential levels of said contacts;

magnetic field generating means positioned in close proximity to said vacuum apparatus so as to generate a magnetic field within the confined space of said evacuated envelope wherein the magnetic field pattern and electrostatic field pattern developed by said high voltage source are aligned substantially transverse to one another;

means coupled in series with said high voltage source between said electrical contacts for measuring the ionizing current flowing between said contacts as a result of ionizing collisions produced by stray electrons within said envelope when acted upon by said cross-connected electrostatic and magnetic fields.

7. The apparatus of claim 6 wherein said magnetic field generating means is comprised of a substantially annular-shaped permanent magnet surrounding the vacuum envelope so as to generate a magnetic field within the confined space of the vacuum envelope whose field lines are substantially in alignment with the longitudinal axes of said electrical contacts.

8. The apparatus of claim 7 wherein said magnetic field generating means is comprised of a substantially cylindrical shaped electrical coil surrounding the vacuum envelope so as to generate a magnetic field within the confined space of the vacuum envelope whose field lines are substantially in alignment with the longitudinal axes of said electrical contacts.

9. The apparatus of claim 6 wherein said measuring means is comprised of capacitor means connected to said vacuum apparatus being charged at a rate determined by the resistance of said vacuum apparatus;

a normally open discharge path coupled across said capacitor means including means for closing said discharge path when said capacitor means reaches a first predetermined threshold voltage and for reopening said discharge path when said capacitor means discharges to a second predetermined threshold level;

means for counting the number of charge-discharge cycles experienced by said capacitor means for determining the resistance value of the vacuum interrupter under test.